(No Model.)
O. PLATH.
AUTOMATICALLY ACTUATED FISHING ROD HOLDER.
No. 562,195. Patented June 16, 1896.
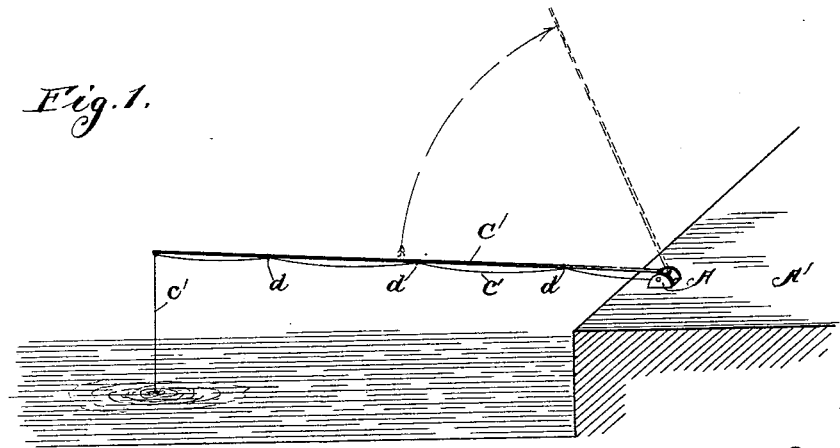
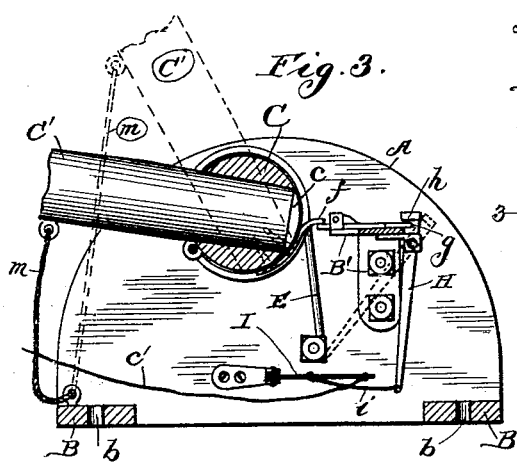 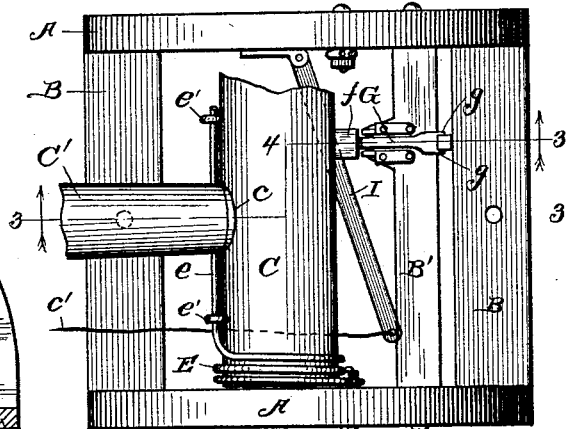
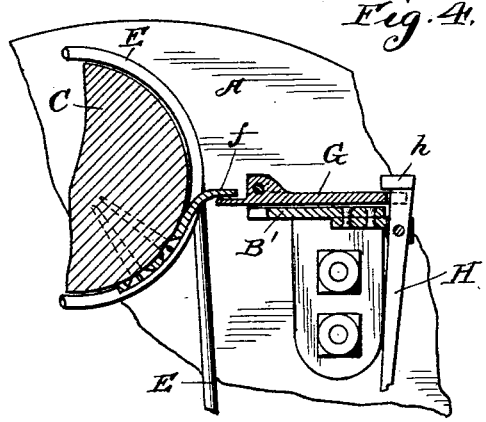 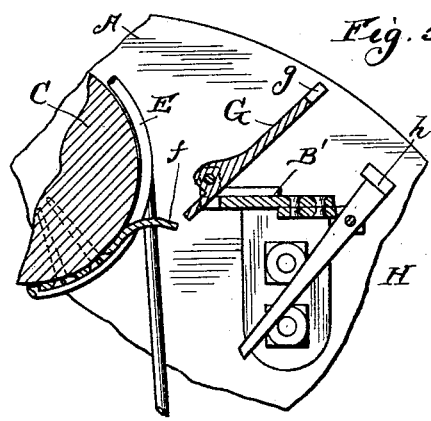
Witnesses:
W. J. Jacker
E. A. Duggan
Inventor:
Oscar Plath
By Chas. C. Tillman,
Atty.

UNITED STATES PATENT OFFICE.

OSCAR PLATH, OF CHICAGO, ILLINOIS.

AUTOMATICALLY-ACTUATED FISHING-ROD HOLDER.

SPECIFICATION forming part of Letters Patent No. 562,195, dated June 16, 1896.

Application filed February 29, 1896. Serial No. 581,255. (No model.)

*To all whom it may concern:*

Be it known that I, OSCAR PLATH, a citizen of the United States, residing at Chicago, in the county of Cook and State of Illinois, have invented certain new and useful Improvements in a Self-Angling Fishpole Apparatus, of which the following is a specification.

This invention relates to improvements in an apparatus to be used for automatically operating a fishing-pole, so as to raise the free end thereof, from which the line depends, with a sudden movement; and it consists in certain peculiarities of the construction, novel arrangement, and operation of the various parts thereof, as will be hereinafter more fully set forth and specifically claimed.

The objects of my invention are, first, to provide a self-angling fishpole apparatus, which shall be simple and inexpensive in construction, strong and durable, and effective in operation, and, second, such a device, which may be readily secured to any suitable support, and will hold the pole in a fixed and proper position, until a bite on the line by the fish is had, when, by reason of the peculiar construction and operation of the parts of my invention, the pole will be raised to about a vertical position.

In order to enable others skilled in the art to which my invention pertains to make and use the same, I will now proceed to describe it, referring to the accompanying drawings, in which—

Figure 1 is a perspective view of a portion of a pier or other support with my apparatus secured thereon, showing by continuous lines the fishing-pole in position for angling and by dotted lines the raised position thereof. Fig. 2 is a plan view showing the spring-actuated securing-drum for the pole, foreshortened for the convenience of illustration. Fig. 3 is a cross-sectional view, partly in elevation, taken on line 3 3 of Fig. 2. Fig. 4 is an enlarged fragmental view, partly in section, taken on line 4 4 of Fig. 2, showing some of the parts in the position they will occupy when the pole is "set;" and Fig. 5 is a like view, taken on the same line, showing the position of some of the parts after the trigger has been released by a pull on the fishing-line.

Similar letters refer to like parts throughout the different views of the drawings.

A represents the side pieces of the frame of my apparatus, which are made of any suitable size, form and material, but preferably semicircular, as shown in Fig. 3, and are placed and held parallel to one another, by means of suitable cross-pieces B, which are located at the base of the side pieces, and are provided with suitable openings $b$, for the reception of screws or nails to secure the frame to a support A', of any kind. Within the upper portion of the side pieces A is secured in suitable bearings a drum C, which is provided with a transverse socket or opening $c$, at about its middle, for the reception of the fishing-pole C', of the ordinary or any preferred kind, which pole is provided on its lower surface, at suitable distances apart, with suitable guide-eyelets $d$, through which the fishing-line $c'$ passes, the shore end of which is secured to the operating or releasing lever I, as will be presently explained.

Around each end of the drum C is placed a spring E, the ends of which are secured to the side pieces of the frame, as is clearly shown in Figs. 2 and 3 of the drawings. The coiled portions of the spring E may be united by a piece $e$, as shown in Fig. 2, which is secured by means of staples $e'$ to the drum, thus affording a durable spring, having sufficient strength to raise the pole at the proper time. On the surface of the drum, and near the socket therein for the pole, is secured a catch or projection $f$ for the trigger G, which is pivoted on the cross-piece B', located parallel with the drum and secured to the side pieces of the frame. The trigger G is pivoted on the upper portion of the cross bar or brace B', and extends slightly beyond the sides or edges of said brace, the extended portion adjacent to the drum being adapted to contact with the catch $f$, and the extended portion on the opposite end of the trigger is preferably formed with prongs $g$, to form a fork for the reception of the pendent lever H, which is pivotally secured to the brace or crosspiece B', and is formed at its upper portion with an enlargement or head $h$, to engage the outer end of the trigger G, as is apparent by reference to the drawings.

Beneath the drum, and to one of the side pieces of the frame, is pivotally secured a releasing-lever I, which is formed at its free end with an opening, through which the fishing-line c' may pass or be connected. The releasing-lever I is united to the lever H, by means of a suitable connection i, so that when a bite is had on the line c', the operating or releasing lever I will thereby be drawn forward, as indicated by dotted lines in Fig. 3 of the drawings, which operation will release the head of the pendent lever H from the outer end of the trigger G, thus allowing the pole to be raised, by reason of the tension of the spring E on the drum in which the fishing-pole is socketed. In order to prevent the pole being raised too far or thrown entirely over, I connect it by means of a suitable elastic piece m to one of the cross-pieces B of the frame.

From the foregoing and by reference to the drawings it will be seen and readily understood that my apparatus can be used with almost any kind of a pole, but in order to operate the device satisfactorily, the pole should be provided with eyelets d, to guide the fishing-line, and to allow it to pass freely therethrough. When thus equipped, the inner end of the fishing-line is secured to the end of the operating or releasing lever I, and the outer end is provided with a baited hook, as usual, and dropped into the water, when by reason of a pull thereon, caused by the bite of a fish, the releasing-lever will be drawn forward, which will cause the release of the trigger G from the catch on the drum, as before set forth.

Having thus fully described my invention, what I claim as new, and desire to secure by Letters Patent, is—

1. The combination of a frame, with a socketed and spring-actuated drum revolubly mounted therein, a trigger pivotally secured near the drum, a catch or projection on the drum adapted to engage one end of said trigger, a lever pivoted on the frame and adapted to engage the other end of the trigger, a releasing-lever secured on the frame and having a connection with the pendent lever and fishing-line, a rod secured in the socket of the drum, and said fishing-line running on the rod substantially as described.

2. The combination with a frame, of a socketed and spring-actuated drum revolubly mounted therein, a catch or projection secured on the drum, a securing and releasing mechanism for said catch located on the frame, a pole having eyelets and secured in the socket of the drum, and a fishing-line running through said eyelets and connected to said releasing mechanism, substantially as described.

OSCAR PLATH.

Witnesses:
CHAS. C. TILLMAN,
E. A. DUGGAN.